United States Patent [19]

Preuss et al.

[11] Patent Number: 5,857,001
[45] Date of Patent: Jan. 5, 1999

[54] OFF CHIP DRIVER WITH PRECOMPENSATION FOR CABLE ATTENUATION

[75] Inventors: Curtis Walter Preuss; Delbert Raymond Cecchi, both of Rochester, Minn.

[73] Assignee: International Business Machines Corporation, Armonk, N.Y.

[21] Appl. No.: 797,898

[22] Filed: Feb. 10, 1997

[51] Int. Cl.⁶ .................................................. H04N 7/10
[52] U.S. Cl. ........................ 375/257; 375/285; 375/296; 455/114; 455/115; 332/159; 332/123
[58] Field of Search ................................. 375/296, 254, 375/257, 285, 284, 219; 455/63, 114, 115; 332/159, 123, 125

[56] References Cited

U.S. PATENT DOCUMENTS

| | | | |
|---|---|---|---|
| 3,980,826 | 9/1976 | Widmer | 178/68 |
| 5,058,131 | 10/1991 | Thacker | 375/36 |
| 5,204,880 | 4/1993 | Wurster et al. | 375/36 |
| 5,253,272 | 10/1993 | Jaeger et al. | 375/60 |
| 5,263,049 | 11/1993 | Wincn et al. | 375/36 |
| 5,299,230 | 3/1994 | Jaeger et al. | 375/60 |

*Primary Examiner*—Jason Chan
*Assistant Examiner*—Congvan Tran
*Attorney, Agent, or Firm*—Andrew J. Dillon; Daniel E. Venglarik

[57] ABSTRACT

A digital data waveform precompensated for off-chip cable attenuation includes peaks with exponential tails at signal transitions. A driver output stage generating the waveform includes an output transistor pulling the output to a peak voltage level when an input goes high. After a delay, a transistor closes a feedback loop containing a resistive load, exponentially changing the voltage level of the output to a final voltage level. A complementary output transistor pulls the output to a ground voltage level when the input goes low, with a transistor closing a feedback loop containing a resistive load for exponential change of the output to a final voltage level. The separate resistive paths equalize the time constant of the exponential tails despite a difference in the gate capacitances of the output transistors. The received waveform after cable attenuation exhibits pulse shapes closer to the predefined pulse shapes on which a receiver is designed to operate.

17 Claims, 8 Drawing Sheets

OFF CHIP DRIVER WITH PRECOMPENSATION FOR CABLE ATTENUATION

BACKGROUND OF THE INVENTION

1. Technical Field

The present invention relates in general to data transmission and in particular to extending the distance over which data may be transmitted on a transmission line which inherently distorts the transmission. Still more particularly, the present invention relates to introducing predistortion to a data transmission waveform which is the inverse of distortion inherent in a transmission line.

2. Description of the Related Art

Digital data is typically transmitted over various metallic transmission media, including coaxial cables, in the form of a series of square waves or pulses. Digital signals transmitted over cables or other transmission media may be severely distorted due to attenuation losses inherent in the cables. Such cable losses limit the data transmission rate and/or the distance over which signals may be transmitted.

The data transmission rate for an information bearing signal on a transmission line is limited by data jitter, or the tendency of transitions to occur at different points during the respective signal periods. Data jitter arises as a result of two phenomenon: transmission line attenuation typically increases with frequency; and data transitions in adjacent signal periods appear, to the transmission line, as a signal with a different set of frequencies than transitions which are separated by several signal periods. For example, transmission of the pattern 10101010 will be attenuated differently than transmission of 10011001. The higher attenuation causes signals with irregular transitions to be more severely distorted, with transitions occurring at different points during the signal period than in signals with regular transitions. This limits the pulse width, and thus the data rate, at which data may be accurately transmitted and received.

The distance over which an information bearing signal may be transmitted on a transmission line is primarily limited by the phase distortion introduced by the transmission line. Progressive alteration of the pulse shape from the predetermined pulse shape for which a receiver is designed to operate may lead to transmission errors and limit the maximum range of the transmission.

Several prior art approaches attempt to alleviate the problems arising from distortion. One approach, known as receiver equalization, involves processing the received signal to make it more nearly correspond to the predetermined pulse shape. However, receiver equalization is often complicated by overlap in adjacent pulses in high speed transmission systems.

A second prior art approach, referred to as predistortion or transmitter equalization, employs a mechanism at the output of the transmitter to alter the shape of the pulse introduced onto the transmission line. The predistortion is intended to be the inverse of the distortion resulting from inherent cable losses. This technique is suitable when an estimate of the distortion introduced by the transmission line is available, as where the length and material of the transmission line is known. A variant of this approach, known as adaptive predistortion, attempts to accommodate differing lengths in the transmission lines. However, in both the basic technique and the variant of adaptive predistortion, a source of clock pulses is typically required to operate the predistortion mechanism. Moreover, where digital filter techniques are used to synthesize a specific pulse shape approximating the ideal predistorted waveform, the required apparatus is very complex and occupies a significant amount of chip area in an integrated circuit. Another predistortion technique applies voltage to the output signal based on whether adjacent data signals are identical or different. Because cable distortion affects all bits in the data stream and is not limited to specific bits, this technique is limited in how closely the predistortion can be made to match the inverse of the cable distortion.

Transmitter or receiver equalizers are the most commonly used technique for dealing with cable attenuation. Passive external components are used to form a filter circuit which has a response approximating the inverse of the cable response, with the "gain" of the filter set to equal the loss of the cable.

Another prior art approach to countering transmission line distortion, which may be used in conjunction with receiver or transmitter equalization, involves special encoding of the data to be transmitted. However, predistortion techniques for such signals may be unsuitable for transmitting unencoded data, also known as NRZ data.

It would be desirable to introduce predistortion to a data transmission waveform which is the inverse of distortion inherent in a transmission line in a simple manner. It would be advantageous if the mechanism for introducing such predistortion did not require a clock pulse or special encoding of the data to be transmitted. It would also be desirable for the mechanism to support transmission of DC coupled data and to introduce varying amounts of predistortion to all bits of the data transmitted.

SUMMARY OF THE INVENTION

It is therefore one object of the present invention to provide improved data transmission.

It is another object of the present invention to provide a method of extending the distance over which data may be transmitted on a transmission line which inherently distorts the transmission.

It is yet another object of the present invention to provide an improved method for introducing predistortion to a data transmission waveform which is the inverse of distortion inherent in a transmission line.

The foregoing objects are achieved as is now described. A digital data waveform precompensated for off-chip cable attenuation includes peaks with exponential tails at signal transitions. A driver output stage generating the waveform includes an output transistor pulling the output to a peak voltage level when an input goes high. After a delay, a transistor closes a feedback loop containing a resistive load, exponentially changing the voltage level of the output to a final voltage level. A complementary output transistor pulls the output to a ground voltage level when the input goes low, with a transistor closing a feedback loop containing a resistive load for exponential change of the output to a final voltage level. The separate resistive paths equalize the time constant of the exponential tails despite a difference in the gate capacitances of the output transistors. The received waveform after cable attenuation exhibits pulse shapes closer to the predefined pulse shapes on which a receiver is designed to operate.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
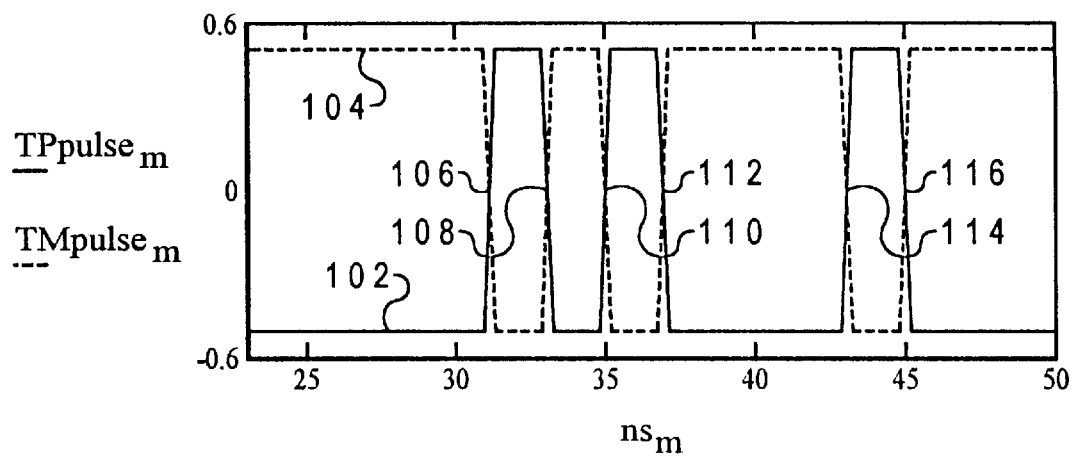
FIGS. 1A–1D depict simulation waveforms demonstrating calculation of appropriate precompensation for a digital data transmission in accordance with a preferred embodiment of the present invention.

With reference now to the figures, and in particular with reference to FIGS. 1A–1D, simulation waveforms demonstrating calculation of appropriate precompensation for a digital data transmission in accordance with a preferred embodiment of the present invention is depicted. FIG. 1A depicts a hypothetical digital signal 102 and its inverse 104 having irregular transitions 106–116 to be transmitted on metallic media. The present invention is thus applicable to either single-ended, in which data is represented by a voltage level or a transition between voltage levels, or balanced (differential) digital signals, in which data is represented by a voltage difference polarity between two signals of a transition in voltage difference polarity.

Figure 1B:
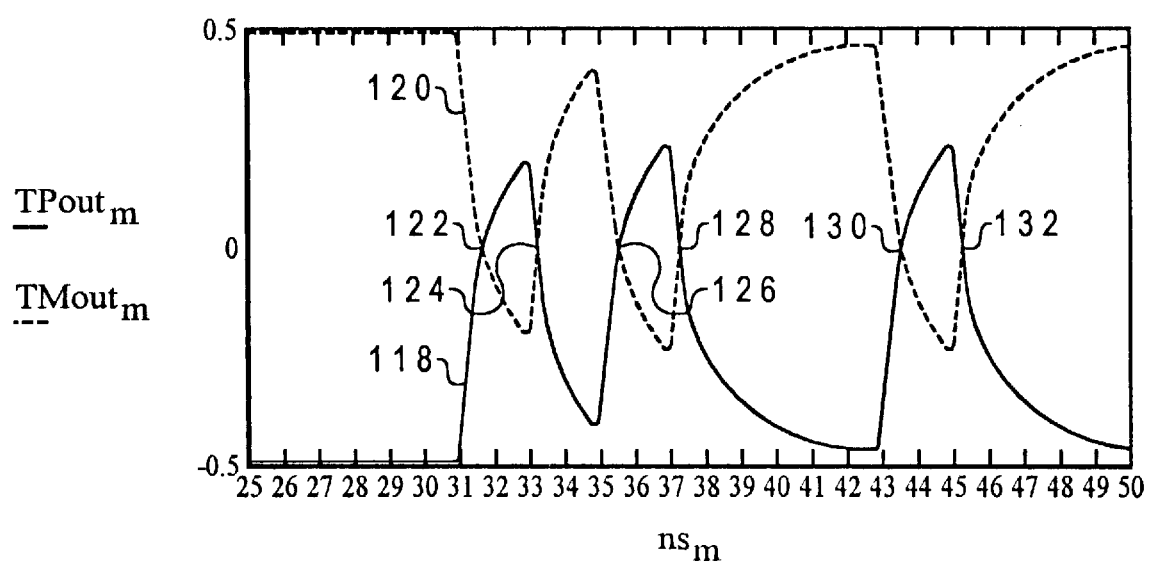

FIG. 1B depicts the attenuated signal 118 and its inverse 120 received at the other end of the metallic media. The exponential nature of the attenuation causes variations in both the transitions and the amplitude of the received signal 118 and its inverse 120. For example, transitions 122–128 in the received signal 118 and its inverse 120, which correspond to transitions 106–112 in FIG. 1A, are irregularly spaced. The maximum amplitude achieved by the received signal 118 and its inverse 120 between transitions 122–132 is also irregular. If the transmitted signal 102 in FIG. 1A is sampled T times in 64 ns, then for $n \in 0, \ldots, T/2$ the received signal 118 may be calculated from the inverse fast Fourier transform (IFFT) of:

$$Sout_n = S_n \cdot e^{-k l \sqrt{0.015625n}} \cdot e^{-jkl\sqrt{0.015625n}} \quad (1)$$

where S is the fast Fourier transform (FFT) of the input waveform 102, k is a constant for cable type (approximately 0.134 for #28 guage cable employed in the depicted simulation), l is the length of the cable (10 meters in the depicted simulation), and j is the square root of negative one.

Based on the simulated attenuation depicted in FIG. 1B and described by equation (1), an input signal which would compensate for the attenuation may then be calculated for $n \in 0, \ldots, T/2$ from the inverse fast Fourier transform of:

$$Scomp_n = \frac{S_n}{e^{-kl\sqrt{0.015625n}} \cdot e^{-jkl\sqrt{0.015625n}}} = S_n \cdot e^{kl\sqrt{0.015625n}} \cdot e^{jkl\sqrt{0.015625n}} \quad (2)$$

Figure 1C:
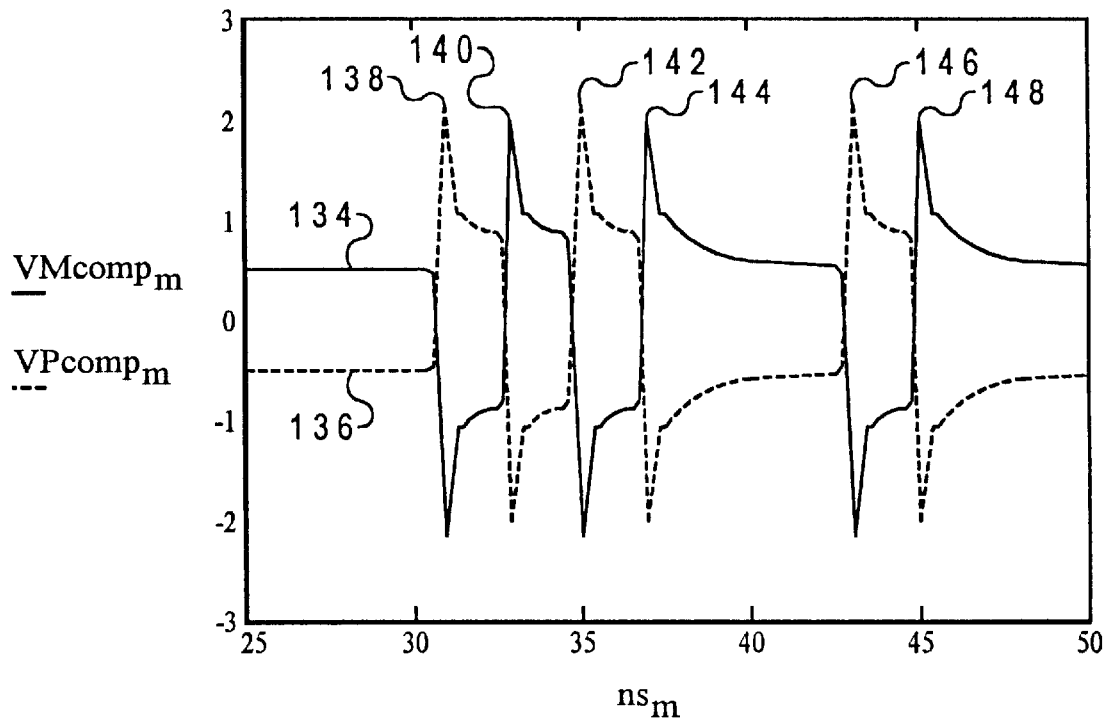

FIG. 1C depicts an output signal 134 and its inverse 136 after applying smoothing to the result of the IFFT of equation (2) to obtain a more realistic waveform from the ideal. Rather than transmitting "square" pulses, the output signal 134 and its inverse 136 comprise a peaked waveform with exponential tails. The amplitude of the peaks 138–148 exceeds the amplitude of the steady-state output signal and exponentially decays to the level of the steady-state output. The amplitudes of peaks 138–148 are irregular, depending on the time since the last peak. The decay of peaks 138–148 spans multiple data bit periods in the transmission.

Figure 1D:
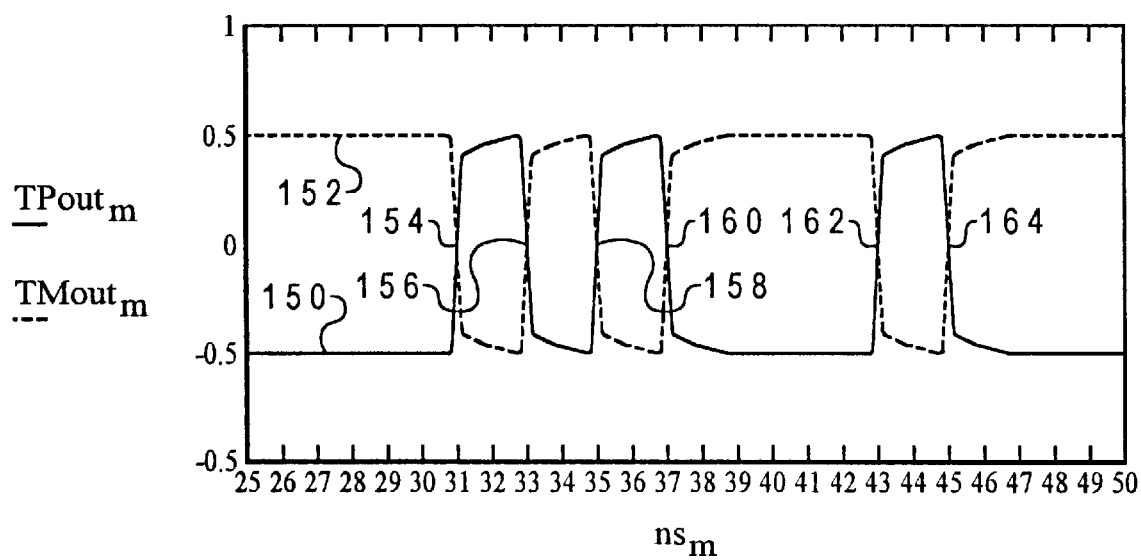

FIG. 1D depicts the signal received at the other end of the transmission line in response to output signal 134 and its inverse 136. Received signal 150 and its inverse 152 are much closer to the "square" pulses desired. Transitions 154–160 in received signal 150 and its inverse 152 display improved uniformity of spacing over received signal 118 and its inverse 120 in FIG. 1B. The amplitudes achieved between transitions 154–164 in received signal 150 and its inverse 152 are both more uniform and more quickly achieved that the amplitudes achieved in received signal 118 and its inverse 120 in FIG. 1B. Received signal 150 and its inverse 152 would require less error correction at higher data transmission rates than a received signal without precompensation, such as received signal 118 and its inverse 120 in FIG. 1B.

Figure 2:
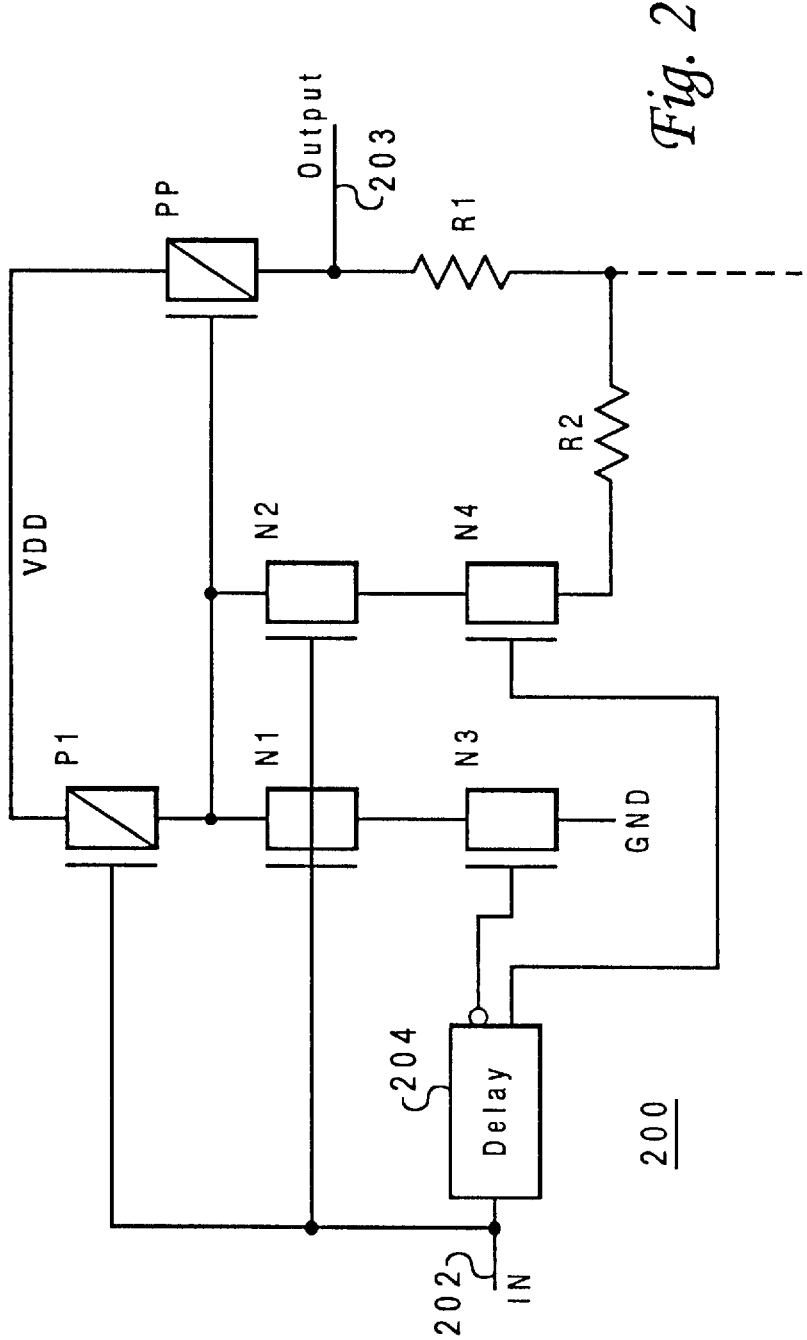
FIG. 2 is a simplified circuit diagram illustrating the technique used to generate a precompensated waveform in accordance with a preferred embodiment of the present invention.

Referring to FIG. 2, a simplified circuit diagram illustrating the technique used to generate the precompensated waveform in accordance with a preferred embodiment of the present invention is portrayed. Circuit 200 generates a waveform approximating the inverse of cable attenuation and is employed for predistorting a digital data signal. Circuit 200 comprises four n-channel transistors N1–N4 and two p-channel transistors P1 and PP in the depicted embodiment. The gates of transistors N1 and N2 are tied together, and both connected to an input terminal 202. The drains of transistors N1 and N2 are similarly tied together, and are connected to both the drain of transistor P1 and the gate of transistor PP. The sources of transistors P1 and PP are both connected to an upper power supply voltage VDD. The gate of transistor P1 is connected to input terminal 202. The drain of transistor PP is connected to an output terminal 203.

The sources of transistors N1 and N2 are connected to the drains of transistors N3 and N4, respectively. Transistor N3 is connected at the gate to the inverted output of delay unit 204 and at the source to a ground terminal GND. Transistor N4 is connected at the gate to the non-inverted output of delay unit 204 and at the source to output terminal 203 through resistive loads R1 and R2, which are connected in series. Delay unit 204 is connected at the input to input terminal 202.

In operation, the signal at input terminal 202 may be assumed to be initially in a low state and transitioning to a high state. Transistor P1 is ON when the input signal is low, holding the gate of transistor PP at a high state such that transistor PP is OFF and the output at output terminal 203 is low. When the input signal goes high, transistors N1 and N2 turn ON. Since the gate of transistor N3 is connected to an inversion of the input signal, transistor N3 was already ON. Thus, the gate of transistor PP is pulled to ground through transistors N1 and N3 and transistor PP is thereby turned ON. The output at output terminal 203 rises to its peak value.

After a delay while the transition of the input signal is transferred through delay unit 204, transistor N3 turns OFF while transistor N4 turns ON. The gate voltage on transistor PP will then charge via a feedback loop comprising resistive loads R1 and R2 and transistors N4 and N2. As the gate of transistor PP charges, the output follows an exponential path to a final value. Resistive loads R1 and R2, together with the gate capacitance of transistor PP, control the time constant at which the output exponentially decays.

When the signal at input 202 returns to a low state, transistors N1 and N2 turn OFF, cutting off the paths from the gate of transistor PP to ground and to the resistive feedback loop. Simultaneously, transistor P1 turns ON, pulling the gate voltage of transistor PP high and turning transistor PP off. In this manner, circuit 200 predistorts the low-to-high transition of a digital data signal to generate a pulse having a peaked output and a exponential tail. This will offset cable attenuation during transmission over metallic media, providing a data signal at the receiver which is closer to the predefined pulse shape for which the receiver is designed.

Figure 3:
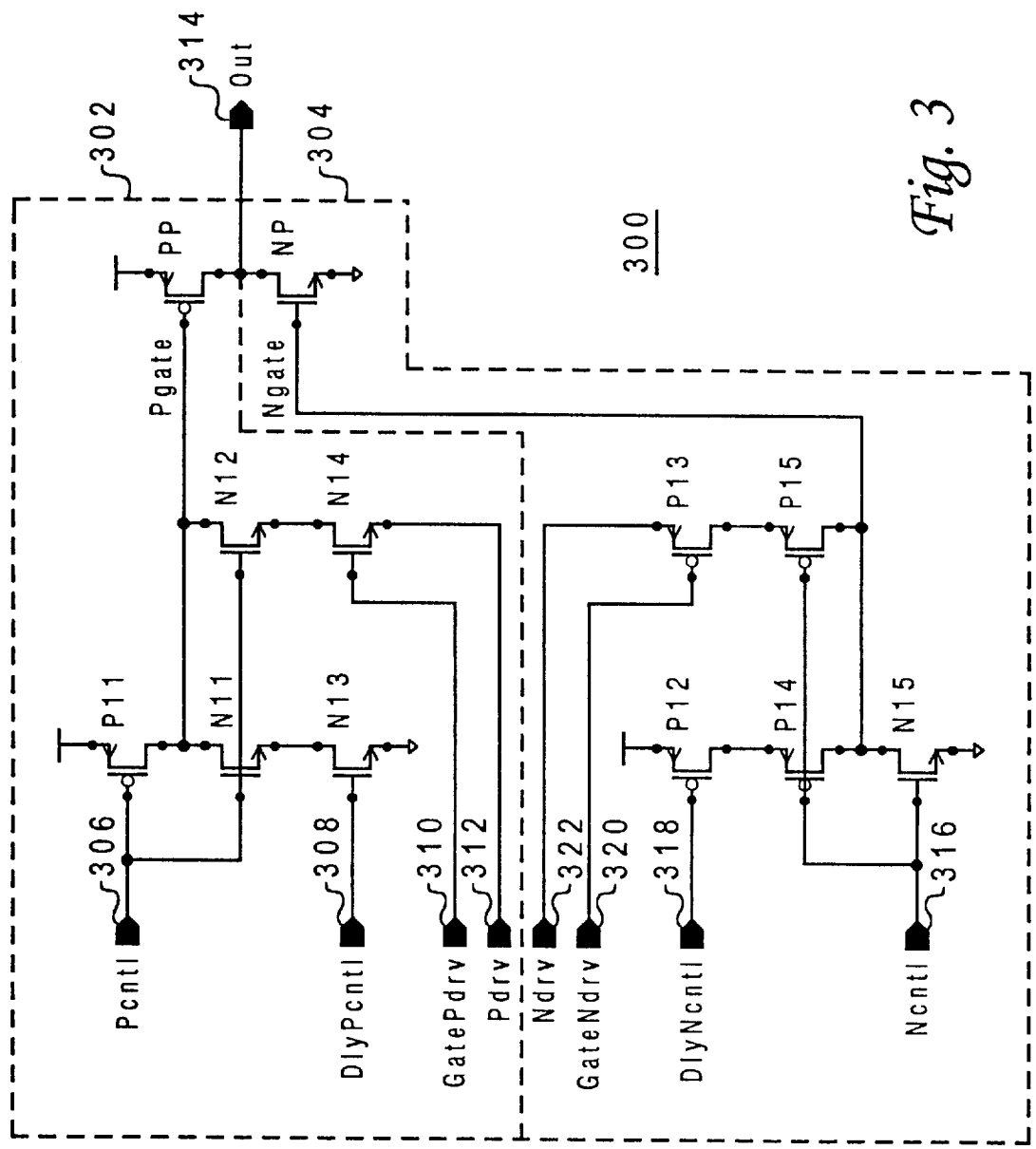
FIG. 3 depicts a circuit diagram for a driver output stage for generating a predistorted waveform in accordance with a preferred embodiment of the present invention.

With reference now to FIG. 3, a circuit diagram for a driver output stage for generating a predistorted waveform in accordance with a preferred embodiment of the present invention is depicted. Driver output stage 300 forms a push-pull output driver which may be incorporated into an integrated circuit differential driver. Circuit elements 302 implement the functionality described above in connection with FIG. 2, while circuit elements 304 implement the complementary function.

Transistors P11, N11 and N12 within circuit elements 302 are connected at their respective gates to input 306, which receives the data signal. Transistor P11 is connected at the source to an upper power supply voltage such as VDD and at its drain to the gate of transistor PP. Transistor PP is connected at the source to an upper power supply voltage and at the drain to output 314. Transistors N11 and N12 are also connected, at their respective drains, to the gate of transistor PP. Transistor N11 is connected at the source to the drain of transistor N13. Transistor N13 is connected at the source to a ground voltage level and at the gate to input 308, which receives an inverted, delayed copy of the data signal. Transistor N12 is connected at the source to transistor N14. Transistor N14 is connected at the gate to input 310, which receives a non-inverted, delayed copy of the data signal, and at the source to input 312, which is connected through a resistive feedback loop (not shown) to output 314. The delay for inputs 308 and 310 over input 306 is substantially identical.

In complementary circuit elements 304, transistors N15, P14 and P15 are connected at their respective gates to input 316, which receives the data signal. Transistor N15 is connected at the source to a ground voltage level and at its drain to the gate of transistor NP. Transistor NP is connected at the source to a ground voltage level and at the drain to output 314. Transistors P14 and P15 are also connected, at their respective drains, to the gate of transistor NP. Transistor P14 is connected at the source to the drain of transistor P12. Transistor P12 is connected at the source to an upper power supply voltage level and at the gate to input 318, which receives an inverted, delayed copy of the data signal. Transistor P15 is connected at the source to transistor P13. Transistor P13 is connected at the gate to input 320, which receives a non-inverted, delayed copy of the data signal, and at the source to input 322, which is connected through a resistive feedback loop (not shown) to output 314. The delay for inputs 318 and 320 over input 316 is substantially identical.

Driver output stage 300 modulates both low-to-high and high-to-low transitions of a data signal. For a low-to-high transition, circuit elements 302 pull the output 314 to a peak value, then cause output 314 to exponentially decay to a final high voltage level. For a high-to-low transition, circuit elements 304 pull the output 314 to ground, then cause output 314 to exponentially rise to a final low voltage level. In this manner, driver output stage 300 creates an output signal precompensated for cable attenuation. Each transition within a digital data signal is predistorted to include a peak exponentially tailing towards a final high or low signal level.

Figure 4:
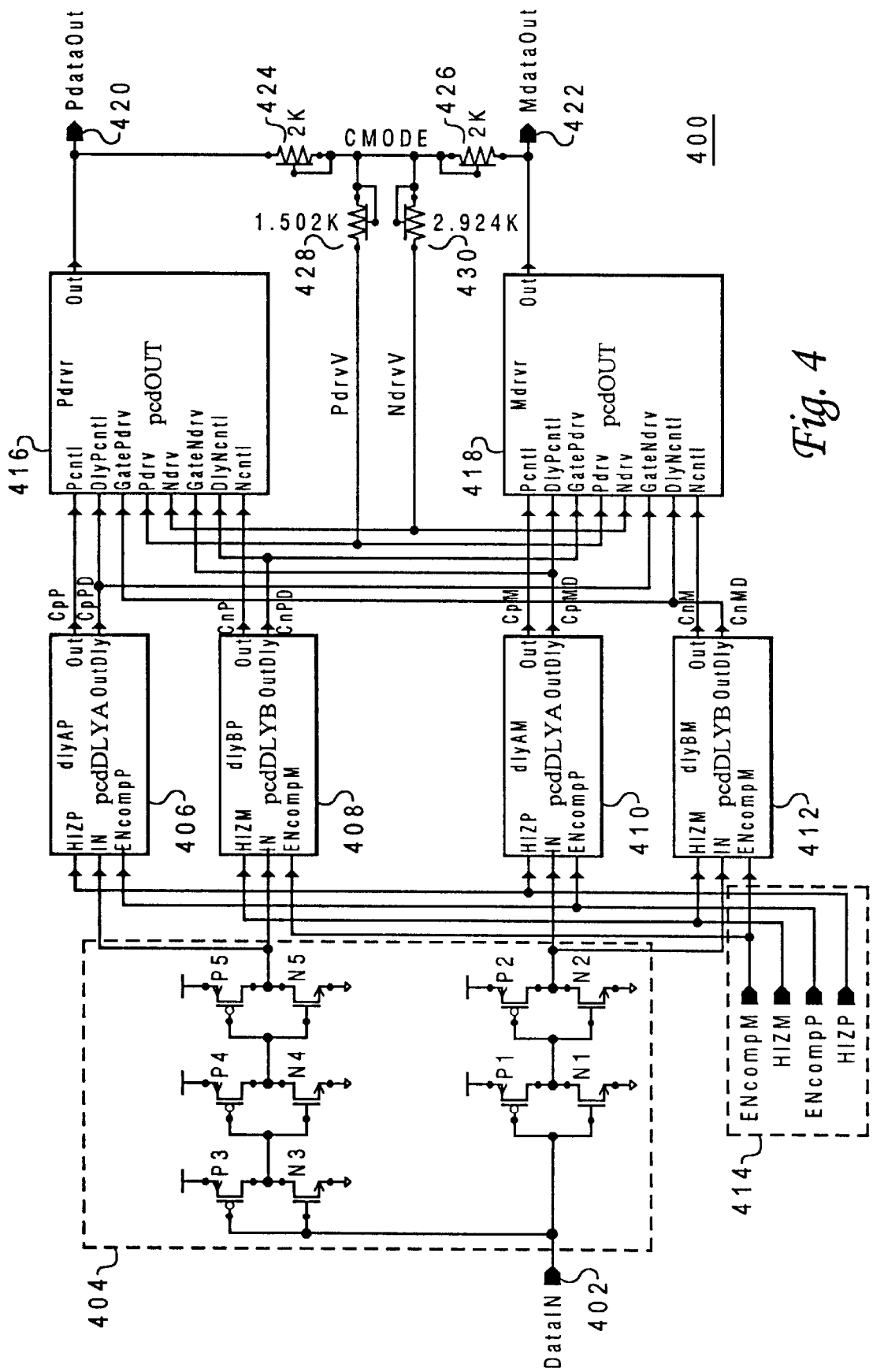
FIG. 4 is a circuit diagram for a single-ended to differential driver which may be employed to generate differential data signals in accordance with a preferred embodiment of the present invention.

Referring to FIG. 4, a single-ended to differential driver which may be employed to generate differential data signals in accordance with a preferred embodiment of the present invention is portrayed. Driver 400 is preferably implemented as a single integrated circuit and precompensates for off-chip cable attenuation. A single-ended data signal is received by driver 400 at input 402 to input stage 404. Input stage 404 acts as a phase-splitter, creating a differential signal by separate inverter paths generating opposite (inverted and non-inverted) copies of the single-ended data signal with equal delay.

The differential signal generated by input stage 404 is then provided to delay units 406–412. Each of delay units 406–412 passes the data signal through and also generates a delayed copy of the data signal. Delay units 406 and 408 create non-inverted, delayed copies of the negative differential data signal. Delays units 410 and 412 create non-inverted, delayed copies of the positive differential data signals. In each delay unit 406–412, however, the delay is substantially identical. The delayed copy of the data signal lags the data signal by about 400 ps, and may be created by a string of inverters. Inputs 414 to delay units 406–412 may be employed for test functions, such as tristating the output.

The outputs of delay units 406–412 are passed to output stages 416 and 418, which drive the positive output 420 and negative output 422, respectively. Output stages 416 and 418 each contain the driver output stage circuit depicted in FIG. 3. In this manner, both the positive output 420 and the negative output 422 may be precompensated for both low-to-high and high-to-low transitions. Resistive loads 424 and 426 are connected in series across outputs 420 and 422. Resistive load 428 is connected from the junction of resistive loads 424 and 426 to one input of output stages 416 and 418, while resistive load 430 is connected between the junction of resistive loads 424 and 426 and a different input of output stages 416 and 418. The two resistance paths allow for equalization of the time constants for exponential change in the output signals. The RC time constant controlling the exponential change in the output signals is created in part by the gate capacitance of either an n-channel device or a p-channel device. Because the gate capacitance of p-channel devices is typically greater than the gate capacitance of n-channel devices, the time constants must be equalized by employing different resistive paths to the output stage circuit elements distorting low-to-high transitions than to output stage circuit elements distorting high-to-low transitions.

Figure 5A:
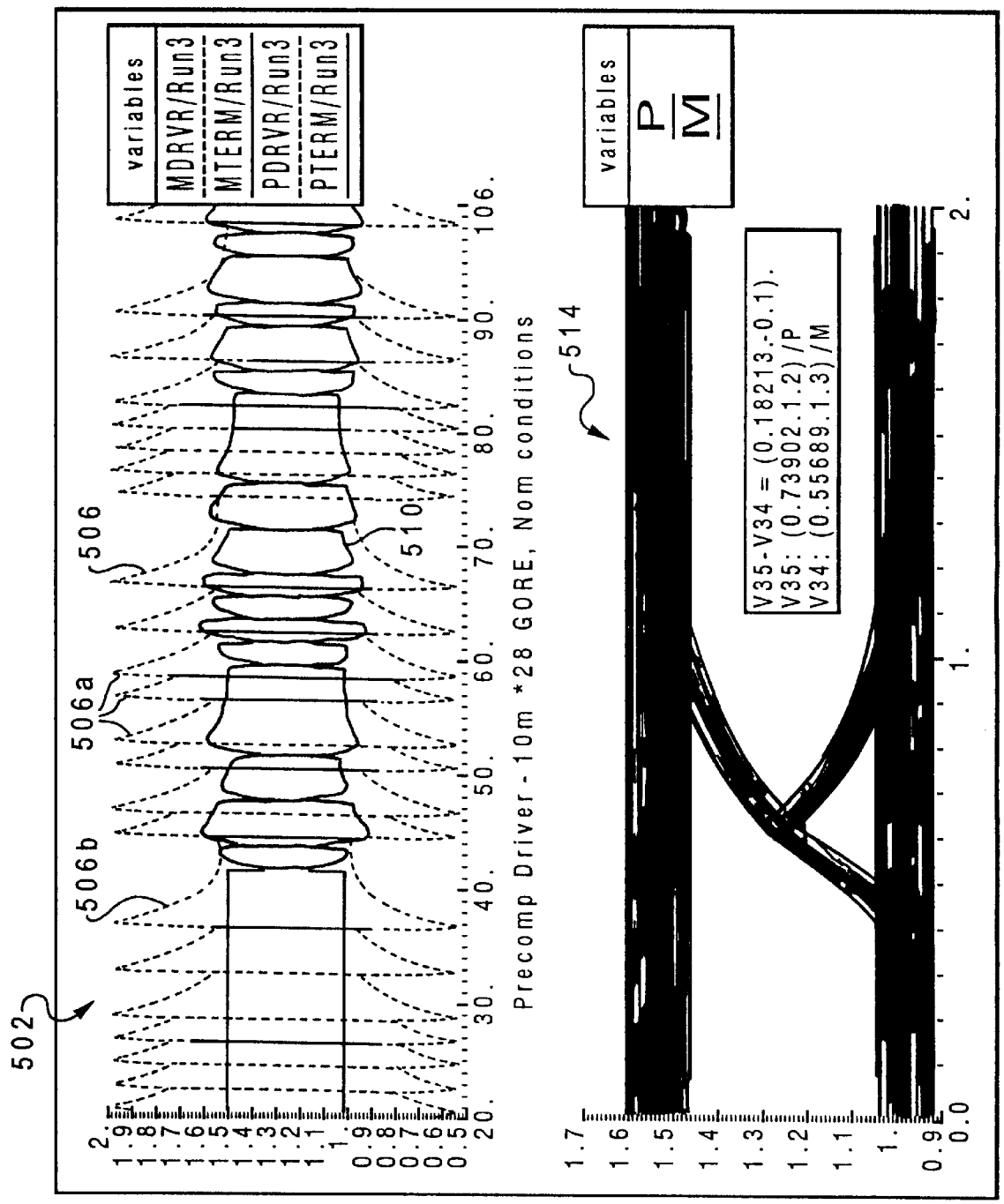
FIGS. 5A–5B depict comparative plots demonstrating the benefits of precompensation in accordance with a preferred embodiment of the present invention.
Figure 5B:
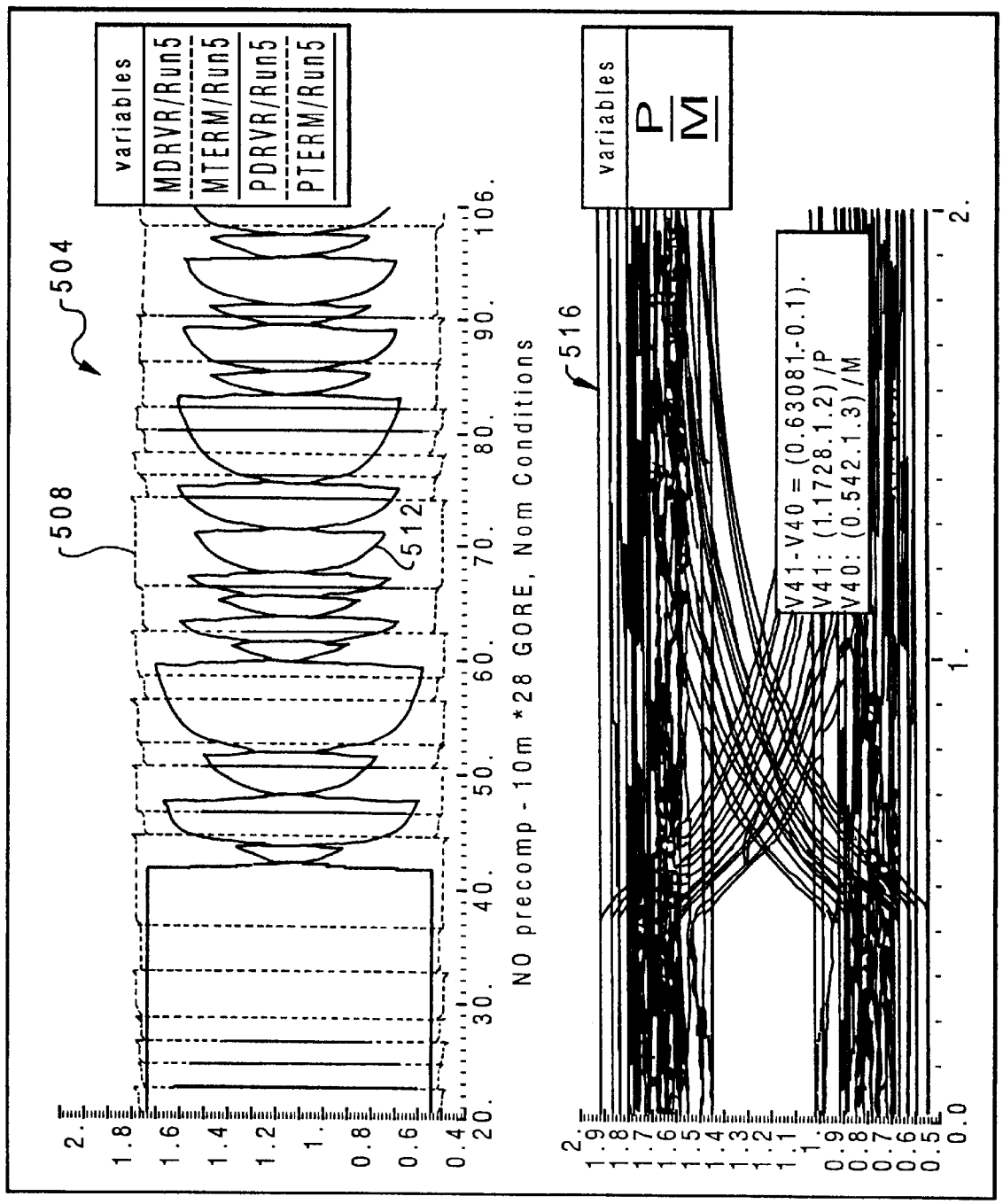

With reference now to FIGS. 5A and 5B, comparative plots demonstrating the benefits of precompensation in accordance with a preferred embodiment of the present invention are depicted. Driver 400 from FIG. 4 was simulated transmitting a 500 MHz differential data signal across a 10 meter length of #28 gauge cable. The results of FIG. 5A were obtained employing the precompensation mechanism of driver 400 (e.g., transmitting the signal from outputs 420 and 422 of driver 400), while the results of FIG. 5B were obtained when the precompensation mechanism was not employed (e.g., transmitting the signal directly from the outputs of input stage 404).

The upper plots 502 and 504 in FIGS. 5A and 5B show the driver output waveform (dotted traces 506 and 508) and the waveform at the receiving end (solid traces 510 and 512). With precompensation, the driver output waveform 506 comprises peaks 506a with exponential tails 506b. Without precompensation, the driver output waveform 508 comprises essentially square pulses. As can be seen, the levels of the received waveform 510 resulting from transmission of the precompensated waveform 506 are more uniform and more quickly achieve the appropriate signal levels than are the levels of the received waveform 512 resulting from transmission of a waveform 508 without precompensation.

Upper plot 504 in FIG. 5B demonstrates that cable attenuation affects both the level of a bit in a digital data signal and its arrival time. A single, different bit following a long string of similar bits will arrive at a different time than would a single different bit within a string of different bits. Precompensation in accordance with the present invention promotes uniformity in arrival times.

The lower plots 514 and 516 in FIGS. 5A and 5B are "eye-diagrams" for the received signals, in which successive clock periods of the received signal are overlapped. As can be seen, data jitter for the precompensated waveform was significantly less than data jitter for the waveform without precompensation. Without precompensation, the jitter is 630 ps; with precompensation the jitter is reduced to 180 ps.

Figure 6:
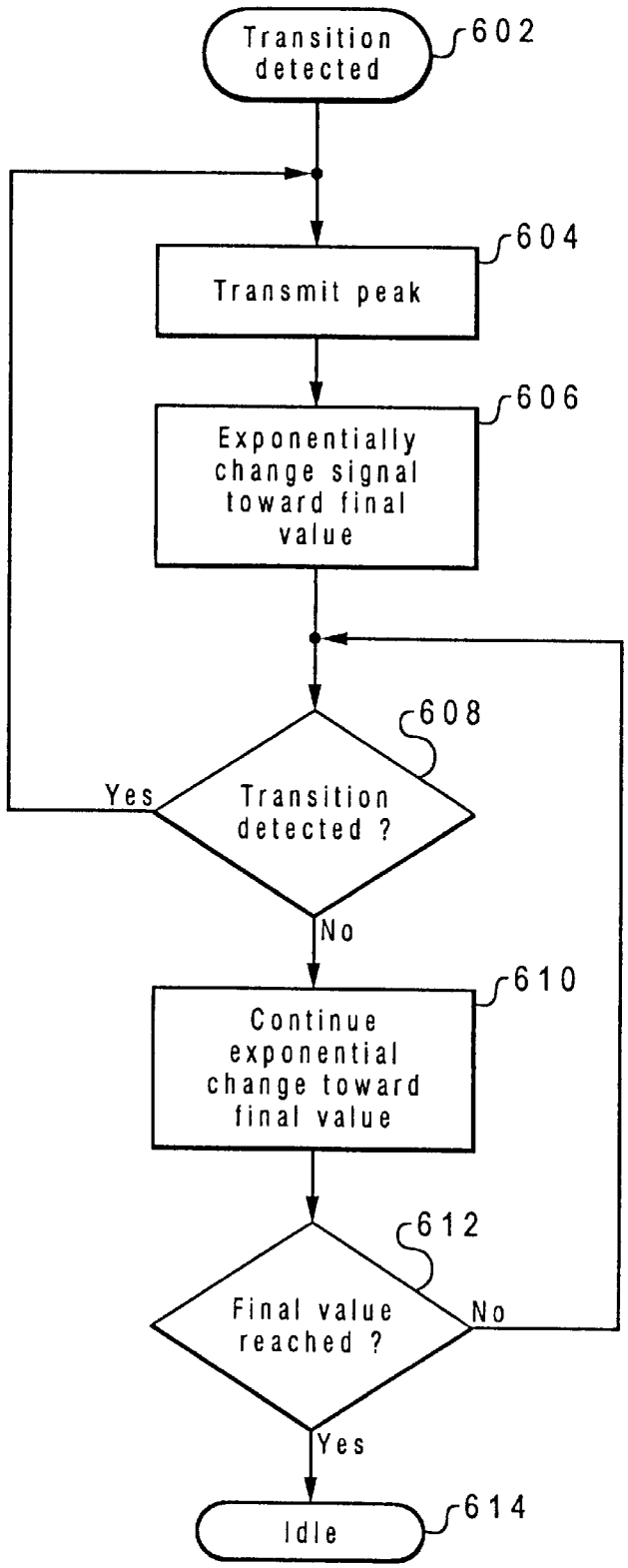
FIG. 6 is a high level flowchart for the method of predistorting a digital data signal in accordance with a preferred embodiment of the present invention.

Referring to FIG. 6, a high level flowchart for a method of predistorting a digital data signal in accordance with a preferred embodiment of the present invention is portrayed. The process is employed to precompensation for cable attenuation in transmission of data signals having a plurality of intermittent transitions between high and low states, which may be irregularly spaced.

The process begins at step 602, which depicts detection of the first transition of the data signal, or the first transition of the data signal since the process last became idle. The process next passes to step 604, which illustrates transmission of a peak output signal representative of either the high or low state, and then to step 606, which depicts exponentially changing the output signal toward a final value. The final output signal value for a high state is between the final output signal state for a low state and the peak value for the high state; similarly, the final output signal value for a low state is between the final output signal value for a high state and the peak value for the low state. Thus, a "peak" output level refers to a relative peak, or a signal level representative of a current state which is further from the final signal level representative of the opposite state than the final signal level for the current state. This may include either an absolute peak, the highest signal level transmitted, or an absolute nadir, the lowest signal level transmitted.

Steps 602 through 606 of the process occur within one data period of the data signal. From step 606, the process passes next to step 608, illustrates a determination of whether a transition is detected in the next data period. If so, the process returns to step 604 and continues from there. If not, however, the process passes to step 610, which depicts continuing to exponentially change the output signal toward a final value for the remainder of the present data period. The process then passes to step 612, which illustrates a determination of whether the final output signal value has been reached in the present data period. If not, the process returns to step 608 and continues from there for the next data period. Preferably the exponential change of the peak value to the final value spans 3–4 data periods. Once a determination is made in step 612 that the final value has been reached, the process passes to step 614, which depicts the process becoming idle until another transition is detected.

Compared to an external equalizer, the precompensation of the present invention avoids the expense and area required for external components. Furthermore, an external equalizer typically causes an impedance mismatch, which can be significant at high data rates. Utilizing the precompensation driver of the present invention does not introduce an impedance mismatch in the connecting cable path.

Passive equalizers must reduce the signal's DC levels in order to provide an AC "gain." The precompensation scheme of the present invention can add an AC boost to the existing DC levels. Active equalizer circuits incorporate capacitors, which are expensive in terms of chip area. The precompensation driver of the present invention does not require additional capacitors. Finally, equalizers which form part of an active receiver circuit act on the signal plus any noise picked up by the cable. Thus the precompensation driver of the present invention has an inherent signal-to-noise ratio advantage.

While the invention has been particularly shown and described with reference to a preferred embodiment, it will be understood by those skilled in the art that various changes in form and detail may be made therein without departing from the spirit and scope of the invention.

What is claimed is:

1. A method of predistorting a data signal including a plurality of transitions between a first state and a second state, comprising:

in response to a transition in said data signal, transmitting an output signal at a peak level representative of a current state of said data signal; and exponentially changing said output signal over a plurality of data periods towards a final level representative of said current state, wherein said data signal is precompensated for a cable attenuation.

2. The method of claim 1, wherein said step of exponentially changing said output signal further comprises changing said output signal at an exponential rate approximating the inverse of said cable attentuation.

3. The method of claim 1, wherein said step of exponentially changing said output signal towards a final level further comprises:

in response to a second transition in said data signal, transmitting an output signal at a peak level representative of a new current state, wherein said new current state is an opposite state from said current state; and exponentially changing said output signal towards a final level representative of said new current state.

4. The method of claim 1, wherein said data signal comprises a differential signal including a first signal and a second signal, a first voltage difference polarity between said first and second signals indicating said first state and a second voltage difference polarity between said first and second signals indicating said second state, said step of transmitting an output signal at a peak level representative of a current state further comprising:

transmitting first and second output signals with a voltage difference between said first and second output signals at a maximum difference and a polarity representative of said current state.

5. The method of claim 4, wherein said step of exponentially changing said output signal towards a final level representative of said current state further comprises:

exponentially changing the voltage difference between said first and second signals toward a final difference.

6. The method of claim 5, wherein said step of exponentially changing the voltage difference between said first and second signals spans a plurality of data periods.

7. An apparatus for predistorting a data signal including a plurality of transitions between a first state and a second state, comprising:

transmission means, responsive to a transition in said data signal, for transmitting an output signal at a peak level representative of a current state of said data signal; and changing means for exponentially changing said output signal over a plurality of data periods towards a final level representative of said current state, wherein said data signal may be precompensated for a cable attenuation.

8. The apparatus of claim 7, wherein said changing means changes said output signal at an exponential rate approximating an inverse of said cable attentuation.

9. The apparatus of claim 7, further comprising:

second transmission means, responsive to a second transition in said data signal, for transmitting an output signal at a peak level representative of a new current state, wherein said new current state is an opposite state from said current state; and second changing means for exponentially changing said output signal towards a final level representative of said new current state.

10. The apparatus of claim 7, wherein said data signal comprises a differential signal including a first signal and a second signal, a first voltage difference polarity between said first and second signals indicating said first state and a second voltage difference polarity between said first and second signals indicating said second state, said transmission means further comprising:

transmission means for transmitting first and second output signals with a voltage difference between said first and second output signals at a maximum difference and a polarity representative of said current state.

11. The apparatus of claim 10, wherein said changing means further comprises:

changing means for exponentially changing the voltage difference between said first and second signals toward a final difference.

12. The apparatus of claim 11, wherein said changing means exponentially changes the voltage difference between said first and second signals over a plurality of data periods.

13. A data signal having a plurality of transitions between a first state and a second state, comprising:

a peak signal level which is a maximum voltage level in said data signal at each transition within said plurality of transitions, said peak signal level exponentially changing toward a final signal level for a current state of said data signal, wherein said data signal is precompensated for cable attenuation.

14. The data signal of claim 13, wherein said data signal further comprises a first signal and a second signal having a voltage difference between said first and second signals, a first voltage difference polarity between said first and second signals representing said first state of said data signal and a second voltage difference polarity between said first and second signals representing said second state of said data signal, said peak signal level further comprising:

a maximum voltage difference between said first and second signals.

15. The data signal of claim 14, said final signal level further comprising:

a voltage difference between said first and second signals less than said maximum voltage difference.

16. An integrated circuit driver with precompensation for off-chip cable attenuation, comprising:

a first output device connected to an output and changing a signal at said output to a first extreme signal in response to a low-to-high transistion in an input signal;

a first filter connected to said first output device, said first filter exponentially changing said signal to a first modulated signal;

a second output device connected to said output and changing said signal at said output to a second extreme signal in response to a high-to-low transistion in said input signal; and a second filter connected to said second output device, said second filter exponentially changing said signal to a second modulated signal.

17. The integrated circuit driver of claim 16, wherein said first output device is a p-channel transistor connected at a source to an upper power supply voltage and at a drain to said output, said first filter is a resistive load connected between said output and a gate of said p-channel transistor, said second output device is an n-channel transistor connected at a source to a ground voltage level and at a drain to said output, and said second filter is a resistive load connected between said output and a gate of said n-channel transistor.

* * * * *